UNITED STATES PATENT OFFICE.

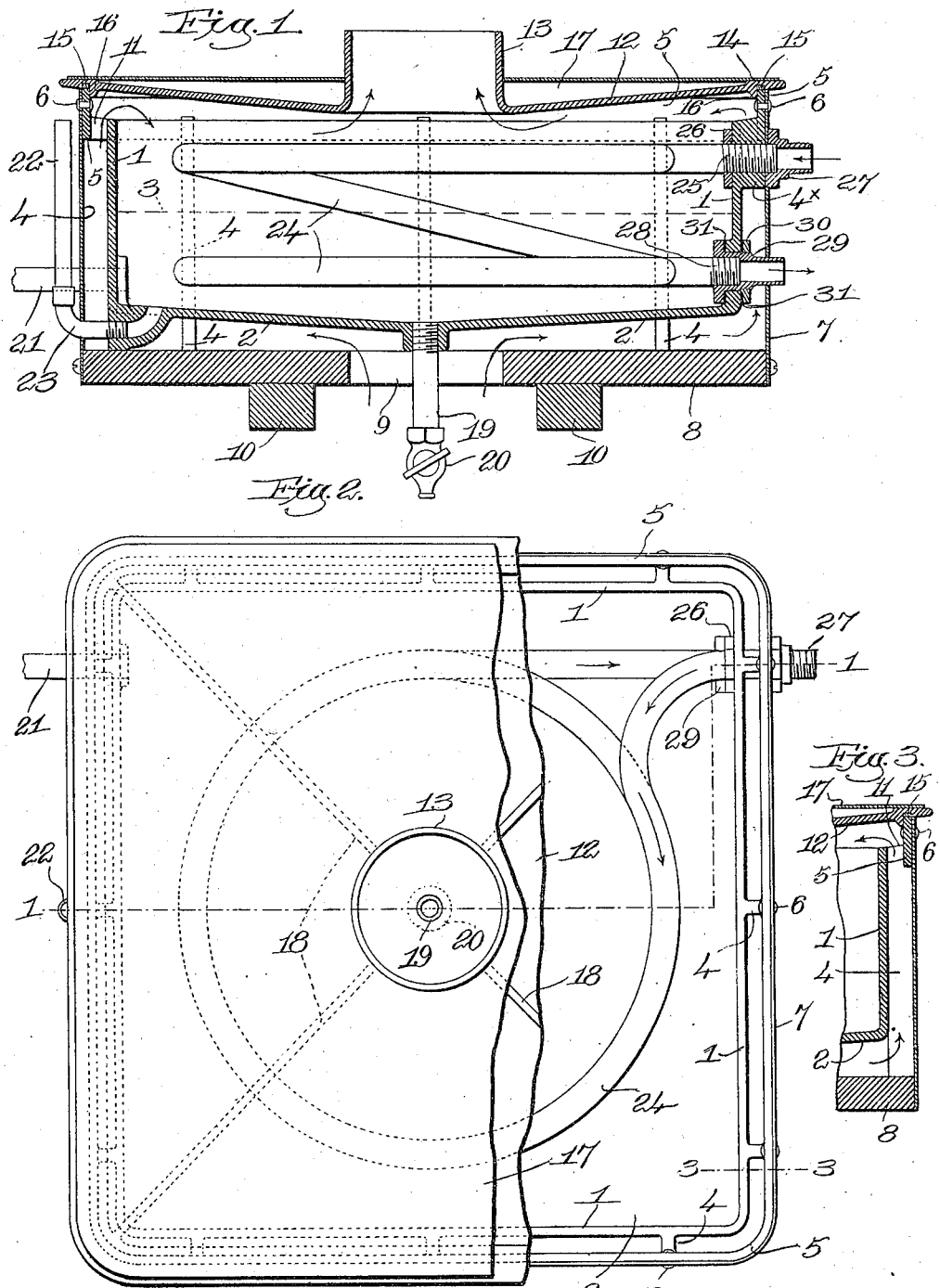

ALBERT W. THOMPSON, OF MANCHESTER, NEW HAMPSHIRE.

HUMIDIFYING APPARATUS FOR DWELLING-HOUSES.

963,829.

Specification of Letters Patent. Patented July 12, 1910.

Application filed March 16, 1910. Serial No. 549,714.

*To all whom it may concern:*

Be it known that I, ALBERT W. THOMPSON, a citizen of the United States, and resident of Manchester, county of Hillsboro, State of New Hampshire, have invented an Improvement in Humidifying Apparatus for Dwelling-Houses, of which the following description, in connection with the accompanying drawing, is a specification, like characters on the drawing representing like parts.

This invention has for its object the production of a simple and efficient apparatus more especially adapted for humidifying the air in a dwelling house, whereby the air circulated therethrough will be moistened or humidified to the desired extent.

In houses heated by hot air furnaces some attempt is generally made to humidify the air by means of an open pan of water located in the furnace, and when the pan is properly attended to the results are in a measure satisfactory, but when steam or hot water is used as the heating medium it is exceedingly difficult to humidify the air without recourse to very expensive apparatus to install and maintain.

By means of my present invention the desired results are obtained at a small outlay and with entire satisfaction.

In accordance with my invention I provide a closed water tank provided with means to heat the water therein sufficiently to furnish a constant supply of vapor, which commingles with fresh air introduced to the tank above the water level and heated prior to its admission to the tank by being caused to pass over surfaces heated by the water within the tank. The warm moist air is discharged from the tank into the lower part of the house in any suitable manner, either by a register provided for the purpose or by connection with an indirect radiator, as may be most convenient.

The heating of the air which is admitted to the tank is most conveniently effected by passing it through an air jacket or casing surrounding the tank, for not only is the fresh air thereby properly heated but the tank itself is insulated and heat therefrom is utilized which otherwise would be wasted by radiation.

I prefer to provide means within the tank to superheat the commingled fresh air and vapor, thereby reducing condensation and providing for a higher temperature of the moist air as it is discharged from the humidifying apparatus into the house.

The various novel features of my invention will be fully described in the subjoined specification and particularly pointed out in the following claims.

Figure 1 is a view in section and elevation of a humidifying apparatus embodying one form of my invention, the section being taken on the irregular line 1—1, Fig. 2; Fig. 2 is a top plan view of the apparatus shown in Fig. 1, the cover being partly broken out; Fig. 3 is a vertical sectional detail on the line 3—3, Fig. 2, to show more clearly certain structural features to be referred to.

Having reference to the drawings, a pan or tank comprising upright side walls 1 and a bottom 2 preferably sloping toward the center, is adapted to contain a body of water, the normal level of which is indicated by the broken line 3, Fig. 1, and as shown herein the tank is substantially rectangular in plan. This tank is conveniently made of cast iron, and upon the outer faces of its walls are formed upright, outwardly extended ribs 4, the lower ends of said ribs terminating in the same plane and serving as supporting feet for the tank.

Upon the upper ends of the ribs I provide an upright flange 5, which extends above the top of the tank and surrounds the same, as clearly shown, the flange being preferably cast integral with said ribs. Said flange is offset from the walls of the tank, as shown, and is substantially parallel thereto, and to the outer face of the flange I secure, as by rivets 6, a sheet metal casing 7 entirely surrounding the tank and fixedly attached at the bottom to a flat base 8, made of wood or metal, as may be most convenient.

The base is apertured at 9, Fig. 1, and as the casing fits tightly against flange 5 and the base 8 the space between the casing and the tank, and between the bottom 2 of the latter and the base 8, constitutes an air jacket or casing for the tank, divided by the ribs 4 into a plurality of upright pockets or chambers which communicate at their open lower ends with the air space beneath the tank.

The base 8 is supported by suitable brackets 10, Fig. 1, on the wall of the cellar near the steam or hot water heating apparatus (not shown) so that fresh air can enter through the aperture 9 and circulate around the tank as indicated by the arrows, Figs. 1 and 3. This air rises in the jacket and escapes into the tank near its top through the outlets 11 formed by the open upper ends of the chambers between the ribs 4, as will be manifest, and as the water in the tank is heated, as will be described, the air in the jacket is gradually heated by traversing the outer surfaces of the tank before it enters the latter. Heat which would otherwise be lost by radiation from the tank is thus utilized to warm the air which enters the tank, and the air jacket for the latter acts as a heat-insulating device for the tank, retaining the heat therein to a large extent.

The tank is closed by a preferably cast iron cover 12, shown in Fig. 1 as dished, sloping inward and downward from the walls 1, and having a central discharge outlet 13. A groove 14 is formed in the under face of the cover for a gasket or packing 15 which rests upon the upper edge of flange 5, and a shoulder 16 on the cover fits inside said flange and retains the cover in place, the cover tightly closing the tank. A sheet metal plate 17 is preferably laid upon the cover 12, to form an air space above it, so that the tank is insulated at the top, and said plate can rest also upon stiffening ribs 18 cast with the cover, see Fig. 2.

The bottom of the tank is provided with a depending discharge pipe 19, Fig. 1, provided with a suitable pet-cock 20, and by means of a pipe 21 the tank can be flushed and cleaned out whenever necessary.

A gage glass 22 connected by a coupling 23 with the bottom of the tank serves to indicate to the user the level of the water in the tank.

To heat the water and cause it to give off vapor I prefer to employ a coil 24, Figs. 1 and 2, so arranged that the lower portion will be submerged by the water while the upper part occupies a portion of the space in the tank above the water line 3, Fig. 1. In said figure I have shown the upper end of the coil threaded at 25 to receive a nut 26 which is screwed up snugly against the inner face of the tank wall 1, the latter having an aperture for the reception of the end 25 of the coil, and a coupling 27 is screwed tightly onto said end 25 outside the tank, thereby firmly attaching the upper or inlet end of the coil to said tank above the water level. As shown in Fig. 1 the threaded end 25 of the coil passes through one of the upright ribs, as 4ˣ, and this rib is much shorter than the other ribs 4 so as not to interfere with the coupling for the outlet end of the coil. Said coupling is connected by a suitably valved pipe (not shown) with the steam or hot water heater so that the heating medium from the heater can pass through the coil, to raise the temperature of the contents of the tank. The lower, or return end of the coil 24 is threaded at 28, Fig. 1, to screw into a flanged nipple 29 which passes through a hole in the tank wall near its bottom, a nut 30 clamping the nipple in place, and preferably I provide gaskets 31 to make the joint fluid tight. At its outer end the nipple 29 is connected with a suitable return pipe communicating with the heater, thereby enabling the heating medium to circulate through the coil 24 and return to the heater.

Obviously the water in the tank will be heated by the submerged portion of the coil, and the vapor arising from the water will commingle with the fresh and heated air entering the tank from the air jacket, the warm, moist air being discharged from the apparatus through the outlet 13 into the house, through the medium of a register provided for the purpose, or by connection with an indirect radiator.

In practice the pipe leading from the outlet 13 should be suitably insulated by an asbestos or other suitable non-conductor of heat, to avoid condensation of the moisture in the air passing therethrough to the interior of the house.

That portion of the coil 24 which is exposed above the surface of the water in the tank acts as a superheater for the commingled air and vapor, the superheating action being proportional to the difference between the temperature of the heating medium in the coil and that of the vapor in the receptacle or tank. Such superheating tends very materially to reduce condensation.

Owing to the arrangement of the air jacket heat otherwise lost by radiation is utilized in warming the air supplied to the house through the humidifying apparatus, and the warm air passing through such apparatus, by virtue of its increased temperature, will convey a large amount of moisture, and the mixture of air and vapor given off from the water will not condense so readily upon the surface of the outlet or discharge pipe as would saturated vapor.

As the air jacket insulates the bottom and sides of the tank the cost of insulating material therefor is obviated.

Any suitable or usual form of gate or needle valve can be used between the heater and the coil 24 to facilitate regulation of the supply of heating medium and bring about the desired rate of evaporation of the water in the tank.

Various changes or modifications in different details of construction and arrangement may be made by those skilled in the art without departing from the spirit and scope of my invention as set forth in the claims annexed hereto.

Having fully described my invention, what I claim as new and desire to secure by Letters Patent is:—

1. Humidifying apparatus comprising a closed tank adapted to contain a body of water an inwardly and downwardly sloping cover to close the tank and having an outlet at its center for the discharge of the moistened air, an air casing or jacket for the bottom and side walls of the tank through which a current of air passes, outlets therefrom communicating with the tank above the water level therein and below the cover at a distance from the central outlet, and means to heat the water in the tank, the vapor rising from the heated water commingling with the air entering the tank and being discharged therefrom into the room, the sloping cover causing the air to pass downward toward and across the greater portion of the surface of the water in the tank.

2. Humidifying apparatus comprising a closed tank adapted to contain a body of water and having an outlet in its top for the discharge of the moistened air, an air casing or jacket for the bottom and sides of the tank through which a current of air passes and is warmed, said casing being divided into a series of open ended, vertical chambers at the sides of the tank, their open upper ends constituting outlets communicating with the interior of the tank near its top and above the water level therein, and a continuous, imperforate heating coil within the tank and partly submerged in the water therein to heat the same, the vapor arising from the surface of the water commingling with the air entering from the jacket, the other portion of the coil between the surface of the water and the closed top of the tank serving to superheat the commingled air and vapor prior to its discharge through the outlet in the top of the tank.

3. Humidifying apparatus comprising a closed tank adapted to contain a body of water and having an outlet in its top for the moistened air, means to introduce a current of air into the tank above the water level therein and to cause the air to be heated prior to its admission to the tank by passing over surfaces heated by the water within the tank, such heated air upon its entrance to the tank communicating with the vapor arising from the heated water therein, and a continuous imperforate heating coil located wholly within the closed tank and partly submerged in the water therein to heat the same, the exposed portion of the coil above the water level superheating the commingled vapor and air before it is discharged from the outlet in the top of the tank.

4. Humidifying apparatus comprising a metal tank adapted to contain a body of water and having a bottom sloping toward its center and having upright, outwardly extended ribs on the outer faces of its side walls, an apertured base on which the feet of said ribs rest, to support the tank, an upright flange carried by and projecting above said ribs and extending around the top of the tank, a metallic casing fixedly secured to the exterior of the flange and to the base, forming with the latter an air casing or jacket surrounding the bottom and sides of the tank, a cover for the latter, fitting tightly on said flange and having a discharge outlet, the air entering the jacket through the aperture in the base and passing into the tank near its top from the upper ends of the chambers formed by the ribs, and a heating coil adapted to be connected with a source of heat and partly submerged in the water in said tank, the exposed portion of the coil above the surface of the water serving as a superheater for the commingled air and vapor in the tank.

5. Humidifying apparatus comprising a metal tank adapted to contain a body of water, an air casing or jacket for the bottom and sides of the tank and having an air inlet adjacent the bottom of the tank, outlets from such casing or jacket communicating with the interior of the tank above the water level therein, a tightly fitting dished cover for said tank, having a central discharge outlet, means to insulate the cover, and a coil for the circulation of a heating medium located within the tank and partly submerged by the water therein, the submerged portion of said coil heating the water to vaporize the same and the exposed portion of the coil serving to superheat the commingled vapor and the air entering from the jacket, the dished cover serving to direct the incoming air downward toward the exposed part of the coil.

In testimony whereof, I have signed my name to this specification, in the presence of two subscribing witnesses.

ALBERT W. THOMPSON.

Witnesses:
WILLIAM A. HEALY,
CARROLL G. KING.